US009967165B2

United States Patent
Arora et al.

(10) Patent No.: US 9,967,165 B2
(45) Date of Patent: May 8, 2018

(54) METHODS, SYSTEMS, AND COMPUTER READABLE MEDIA FOR PACKET MONITORING IN A VIRTUAL ENVIRONMENT

(71) Applicant: Ixia, Calabasas, CA (US)

(72) Inventors: Deepesh Satish Arora, Austin, TX (US); Anirban Majumder, San Ramon, CA (US)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 38 days.

(21) Appl. No.: 14/960,865

(22) Filed: Dec. 7, 2015

(65) Prior Publication Data

US 2017/0163510 A1   Jun. 8, 2017

(51) Int. Cl.
*H04L 12/26* (2006.01)

(52) U.S. Cl.
CPC ........ *H04L 43/0876* (2013.01); *H04L 43/026* (2013.01); *H04L 43/062* (2013.01); *H04L 43/00* (2013.01)

(58) Field of Classification Search
CPC ... H04L 43/0876; H04L 43/06; H04L 43/062; H04L 43/00; H04L 12/26; H04L 12/2602; H04L 12/2618
See application file for complete search history.

(56) References Cited

U.S. PATENT DOCUMENTS

| 6,917,595 | B2 | 7/2005 | Chang et al. | |
| 7,526,691 | B1 * | 4/2009 | Jayabharathi | G01R 31/318555 714/724 |
| 7,899,048 | B1 | 3/2011 | Walker et al. | |
| 9,647,909 | B2 * | 5/2017 | Kuan | H04L 43/045 |
| 9,674,639 | B2 | 6/2017 | Qiu et al. | |

(Continued)

FOREIGN PATENT DOCUMENTS

WO   WO 2014/030061 A2   2/2014
WO   WO 2017/083024 A1   5/2017

OTHER PUBLICATIONS

"Network function virtualization," https://en.wikipedia.org/wiki/Network_function_virtualization, pp. 1-7 (Nov. 23, 2015).

(Continued)

*Primary Examiner* — Warner Wong (57) ABSTRACT

Methods, systems, and computer readable media for packet monitoring in a virtual environment are disclosed. According to one method, the method occurs at a virtual tap controller implemented using at least one processor. The method includes sending, to a virtual tap in a virtual environment implemented using at least one computing platform, at least one summarization rule for generating summary packet information about packet traffic associated with the virtual environment. The method also includes receiving, from the virtual tap, the summary packet information generated using the at least one summarization rule. The method further includes generating, using the summary packet information, at least one processing rule for copying or forwarding packet data associated with the virtual environment and sending, to the virtual tap, the at least one processing rule.

18 Claims, 5 Drawing Sheets

(56) References Cited

U.S. PATENT DOCUMENTS

| | | | |
|---|---|---|---|
| 9,680,728 B2* | 6/2017 | Besser | H04L 43/12 |
| 9,705,849 B2* | 7/2017 | Sood | H04L 63/0272 |
| 2006/0072543 A1 | 4/2006 | Lloyd et al. | |
| 2007/0038744 A1* | 2/2007 | Cocks | H04L 43/0817 709/224 |
| 2007/0195776 A1 | 8/2007 | Zheng et al. | |
| 2007/0280243 A1 | 12/2007 | Wray et al. | |
| 2008/0044018 A1 | 2/2008 | Scrimsher et al. | |
| 2010/0138920 A1 | 6/2010 | Kim et al. | |
| 2010/0199275 A1 | 8/2010 | Mudigonda et al. | |
| 2010/0238923 A1 | 9/2010 | Cheon et al. | |
| 2012/0290703 A1 | 11/2012 | Barabash et al. | |
| 2012/0317566 A1 | 12/2012 | Santos et al. | |
| 2014/0229605 A1 | 8/2014 | Besser | |
| 2014/0229781 A1* | 8/2014 | Whetsel | G01R 31/318555 714/727 |
| 2014/0229945 A1 | 8/2014 | Barkai et al. | |
| 2014/0269709 A1 | 9/2014 | Benny et al. | |
| 2014/0317293 A1 | 10/2014 | Shatzkamer | |
| 2014/0317600 A1 | 10/2014 | Klunder et al. | |
| 2015/0029848 A1* | 1/2015 | Jain | H04L 47/6215 370/235 |
| 2015/0063166 A1 | 3/2015 | Sif et al. | |
| 2015/0234725 A1 | 8/2015 | Cillis et al. | |
| 2015/0236936 A1 | 8/2015 | Waldbusser | |
| 2015/0332357 A1 | 11/2015 | McBride et al. | |
| 2015/0333979 A1 | 11/2015 | Schwengler et al. | |
| 2016/0062781 A1* | 3/2016 | Tsirkin | G06F 9/4843 718/1 |
| 2016/0110211 A1* | 4/2016 | Karnes | G06F 9/45558 718/1 |
| 2016/0191545 A1* | 6/2016 | Nanda | H04L 43/062 726/1 |
| 2016/0232019 A1* | 8/2016 | Shah | H04L 69/22 |
| 2016/0248858 A1 | 8/2016 | Qiu et al. | |
| 2016/0352578 A1 | 12/2016 | Chen et al. | |
| 2017/0048110 A1 | 2/2017 | Wu et al. | |
| 2017/0085459 A1* | 3/2017 | Xia | H04L 43/12 |
| 2017/0094002 A1 | 3/2017 | Kumar et al. | |
| 2017/0099195 A1* | 4/2017 | Raney | H04L 12/4633 |
| 2017/0099197 A1* | 4/2017 | Raney | H04L 43/028 |
| 2017/0118102 A1* | 4/2017 | Majumder | G06F 9/45558 |
| 2017/0141974 A1 | 5/2017 | Lahiri | |
| 2017/0214694 A1 | 7/2017 | Yan | |

OTHER PUBLICATIONS

"Software-defined networking," https://en.wikipedia.org/wiki/Software-defined_ networking, pp. 1-9 (Nov. 13, 2015).

Commonly-assigned, co-pending U.S. Appl. No. 14/939,674 for "Methods, Systems, and Computer Readable Media for Testing Network Function Virtualization (NFV)," (Unpublished, filed Nov. 12, 2015).

"Ixia Phantom vTap™ with TapFlow™ Filtering," Ixia Data Sheet, Document No. 915-6805-01 Rev K, pp. 1-4 (Jul. 2015).

Final Office Action for U.S. Appl. No. 31/765,628, dated (Jul. 27, 2016).

"Virtual Taps," Net Optics: Architecting Visibility Into Your Netowrk, p. 1-5 (accessed Jun. 30, 2016).

Non-Final Office Action for U.S. Appl. No. 13/765,628, dated (Dec. 1, 2014).

Notice of Allowance and Fee(s) Due & Examiner-Initiated Interview Summary for U.S. Appl. No. 13/765,628, dated (Jan. 10, 2017).

Notification of Transmittal of the International Search Report and the Written Opinion of the International Searching Authority, or the Declaration for International Application No. PCT/US2016/05163 dated (Jan. 5, 2017).

Advisory Action and Examiner Initiated Interview Summary for U.S. Appl. No. 13/765,628, dated (Oct. 17, 2016).

Non-Final Office Action for U.S. Appl. No. 14/939,674, dated (Sep. 21, 2017).

* cited by examiner

| RULE ID | REPORT CRITERIA | SUMMARIZATION CRITERIA |
|---|---|---|
| 1 | SEND DATA EVERY 10 MINUTES | SOURCE IP, TIMESTAMP, PROTOCOL NUMBER |
| 2 | SEND DATA AFTER 1 GB OF DATA IS OBTAINED | VM ID, SOURCE IP |
| 3 | SEND DATA WHEN REQUESTED OR MEMORY FULL | VM ID, SOURCE IP, DESTINATION IP, TIMESTAMP, PROTOCOL NUMBER |
| 4 | SEND DATA WHEN CONDITION DETECTED | VM ID, TIMESTAMP, PROTOCOL NUMBER |

METHODS, SYSTEMS, AND COMPUTER READABLE MEDIA FOR PACKET MONITORING IN A VIRTUAL ENVIRONMENT

TECHNICAL FIELD

The subject matter described herein relates to packet monitoring. More specifically, the subject matter relates to methods, systems, and computer readable media for packet monitoring in a virtual environment.

BACKGROUND

A virtual environment typically involves one or more computing platforms and/or hardware executing virtualization software for implementing virtual entities, such as virtual machines (VMs). VMs may be usable for a variety of purposes, including web servers and/or multimedia servers. While physical network taps (e.g., external monitoring devices that monitors packet traffic between two network nodes) can be used to monitor communications in traditional networks, issues can arise in a virtual environment that make using physical network taps less desirable. In particular, since some packet traffic in a virtual environment may exist solely in a single device or computing platform, a physical network tap may be unable to observe this packet traffic effectively.

Accordingly, a need exists for methods, systems, and computer readable media for packet monitoring in a virtual environment.

SUMMARY

Methods, systems, and computer readable media for packet monitoring in a virtual environment are disclosed. According to one method, the method occurs at a virtual tap controller implemented using at least one processor. The method includes sending, to a virtual tap in a virtual environment implemented using at least one computing platform, at least one summarization rule for generating summary packet information about packet traffic associated with the virtual environment. The method also includes receiving, from the virtual tap, the summary packet information generated using the at least one summarization rule. The method further includes generating, using the summary packet information, at least one processing rule for copying or forwarding packet data associated with the virtual environment and sending, to the virtual tap, the at least one processing rule.

According to one system, the system includes a virtual tap controller implemented using at least one processor. The virtual tap controller is configured to send, to a virtual tap in a virtual environment implemented using at least one computing platform, at least one summarization rule for generating summary packet information about packet traffic associated with the virtual environment, to receive, from the virtual tap, the summary packet information generated using the at least one summarization rule, to generate, using the summary packet information, at least one processing rule for copying or forwarding packet data associated with the virtual environment, and to send, to the virtual tap, the at least one processing rule.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored therein computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computing platform or may be distributed across multiple devices or computing platforms.

As used herein, the term 'node' refers to a physical computing platform including one or more processors, network interfaces, and memory.

As used herein, each of the terms 'function', 'engine', and 'module' refers to hardware, which may also include software and/or firmware, for implementing the feature(s) being described.

As used herein, the term "packet" refers to a network packet or any formatted unit of data capable of being transmitted in a computer network, such as protocol data unit, a frame, a datagram, a user datagram protocol packet, a transport control protocol packet, etc.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for packet monitoring in a virtual environment. Packet monitoring in a virtual environment can be difficult since some virtual entities (e.g., virtual machines (VMs) or virtualization containers) may execute at or in a same computing platform and, therefore, physical network taps or other stand-alone devices may be unable to effectively monitor packet traffic between the virtual entities. Another issue associated with packet monitoring that arises in a virtual environment involves the significant traffic volume or bandwidth associated with multiple virtual entities sending and/or receiving traffic. For example, because communications between virtual entities may involve internal communications channels and/or shared memory, a packet monitoring application may be unable to effectively monitor all traffic from the virtual entities because of the high bandwidth of such communications channels and the relatively limited amounts of processing and/or memory resources available to the packet monitoring application.

In accordance with some aspects of the subject matter described herein, techniques, methods, or mechanisms are disclosed for packet monitoring in a virtual environment using a virtual tap controller. For example, a virtual tap controller may configure a virtual tap using a multi-step process. In this example, the virtual tap controller may send summarization rules to a virtual tap for generating traffic related statistics, such as packet count information, VM resource utilization, etc. Continuing with this example, based at least in part on the traffic related statistics, the virtual tap controller may generate one or more processing rules (e.g., packet copy and/or packet forwarding filter rules) to the virtual tap. The virtual tap may implement or enforce the processing rules and may result in packet data being sent to the virtual tap controller or another entity, e.g., a network tool, a network management system, or a network operator.

Advantageously, in accordance with some aspects of the subject matter described herein, by using a virtual tap controller and/or a multi-step monitoring process, the amount of packet traffic that needs to be monitored can be significantly reduced. For example, by using summarization rules to gather traffic related statistics (e.g., VM related metrics) that can identify or indicate traffic related conditions (e.g., resource starvation or traffic congestion), a virtual tap controller may generate efficient (e.g., customized and/or focused) processing rules for gathering packet data about certain traffic that may be causing or contributing to the traffic related conditions. By customizing processing rules to particular traffic patterns (e.g., traffic from a particular VM or a particular type of traffic), a virtual tap may be able to perform packet monitoring without overwhelming available resources (e.g., memory and/or processing throughput).

Reference will now be made in detail to various embodiments of the subject matter described herein, examples of which are illustrated in the accompanying drawings. Wherever possible, the same reference numbers will be used throughout the drawings to refer to the same or like parts.

Figure 1:
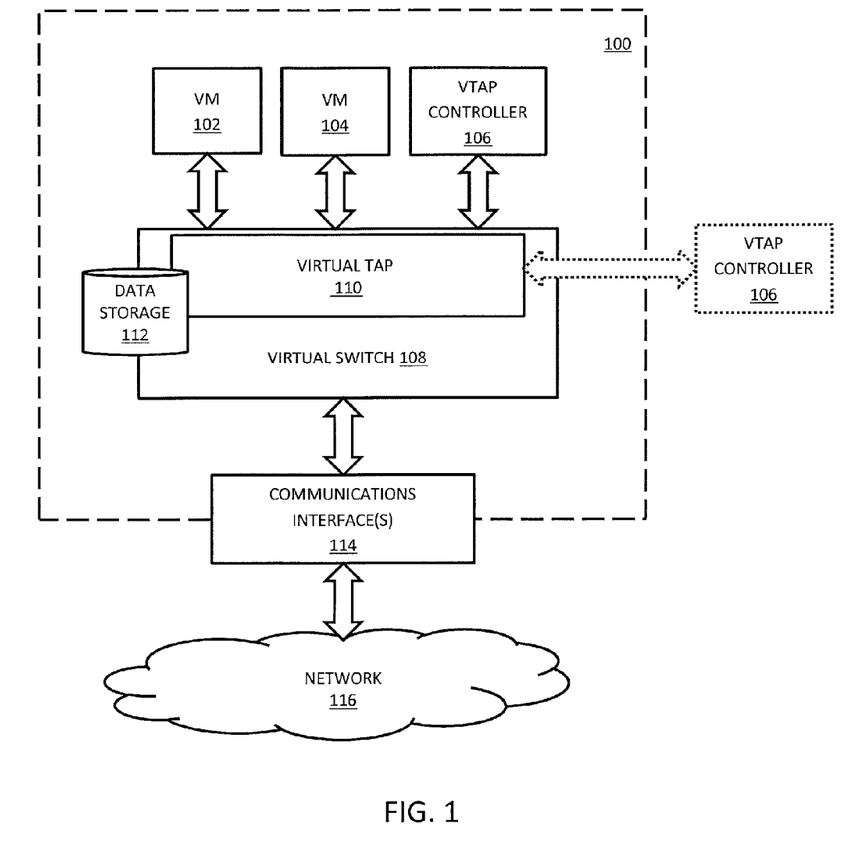
FIG. 1 is a diagram illustrating a virtual environment for packet monitoring according to an embodiment of the subject matter described herein.

FIG. 1 is a diagram illustrating a virtual environment 100 for packet monitoring according to an embodiment of the subject matter described herein. Virtual environment 100 may include one or more computing platforms, nodes, or devices. For example, virtual environment 100 may represent physical hardware (e.g., physical processors, physical communications interfaces, switches, storage devices, etc.) executing virtualization software for implementing virtual entities, such as virtual machines (VMs) and/or virtualization containers. Referring to FIG. 1, virtual environment 100 may include one or more VMs 102-104, VTap controller 106, virtual switch 108, VTap 110, data storage 112, and one or more communications interface(s) 114.

Each of VMs 102-104 may represent any suitable entity (e.g., software stored in a memory and/or executing using at least one processor) for performing one or more computer functions, such as web services, telephony services, multimedia services, and/or other function or services. Each of VMs 102-104 may be a logical construct implemented using hardware or physical resources from one or more locations, devices, and/or platforms. For example, using at least one processor from a first computing platform or server rack and memory from a second computing platform or server rack, VM 102 may perform web server functions, e.g., receiving hypertext transfer protocol (HTTP) requests and providing HTTP responses. In another example, using processors and memory from a same computing platform or server rack, VM 104 may perform SIP related or telephony functions.

VTap controller 106 may represent any suitable entity or entities (e.g., a testing platform, a test tool, a device, a node, and/or software in a VM executing on one or more computing platforms) for configuring VTap 110 and/or performing aspects associated with packet monitoring. For example, VTap controller 106 may configure VTap 110 to perform various packet monitoring related activities, such as packet filtering, packet screening, packet copying, and/or packet forwarding. In some embodiments, VTap controller 106 may generate and/or send summarization rules for obtaining summary packet information. Examples of summary packet information may include metrics and/or statistics correlated or aggregated based on one or more similar characteristics, e.g., packet counts and/or resource utilization correlated by Internet protocol (IP) addresses, destination IP addresses, timestamps, protocol numbers or types, and/or VM identifiers (IDs).

In some embodiments, summarization rules may include instructions for collecting, generating, and/or aggregating traffic statistics or summary packet information associated with packet traffic that traverses virtual switch 108 or VTap 110. For example, a summarization rule may instruct VTap 110 to gather certain statistics and/or parameter values based on transmission control protocol (TCP) packets originating from VM 102. In another example, a summarization rule may instruct VTap 110 to gather certain statistics and/or parameter values based on user datagram protocol (UDP), session initiation protocol (SIP), and/or real-time transport protocol (RTP) packets originating from VM 104. In another example, a summarization rule may instruct VTap 110 to gather certain statistics (e.g., packet counts) and/or parameter values (e.g., a source IP address, a timestamp, and a protocol number) from all observed packets.

In some embodiments, VTap controller 106 may interact with various entities for detecting network conditions and/or traffic related conditions associated with virtual environment 100. For example, VTap controller 106 may use summary packet information received from VTap 110 to detect potential traffic related conditions. In another example, a resource monitoring application (e.g., executing at a hypervisor) may provide VTap controller 106 with resource utilization statistics. In this example, the resource utilization statistics may indicate scenarios where one VM (e.g., VM 102) is hogging too many resources, thereby starving other VMs (e.g., VM 104)

In some embodiments, VTap controller 106 may use summary packet information received from VTap 110 and/or other obtained information to generate processing rules for VTap 110. In some embodiments, processing rules may include instructions for copying and/or forwarding packet data that traverses virtual switch 108 or VTap 110 to VTap controller 106 and/or other entities. For example, a processing rule may instruct VTap 110 to copy and forward the first 50 bytes of all TCP packets having a source IP address 'A' and originating from VM 102 to a network operations center (NOC). In another example, a processing rule may instruct VTap 110 to copy and forward destination IP addresses of all video-based packets originating from VM 102 to a network operator. In another example, a processing rule may instruct VTap 110 to copy and forward all observed packets having a source IP 'B' and a destination IP 'C' in a 20 minute time period to a logging and/or analysis application.

In some embodiments, VTap controller 106 may include functionality for performing various actions associated with analyzing, mitigating, and/or managing traffic related conditions. For example, in response to detecting a traffic related condition associated with VM 102, VTap controller 106 may send a command message for instructing VM 102 to terminate, start, restart, stop, or pause. In another example, VTap controller 106 may (re)configure processing and/or memory resources associated with VTap 110 and/or virtual switch 108, e.g., to increase or improve packet monitoring by VTap 110.

Virtual switch 108 may represent any suitable entity (e.g., software stored in a memory and/or executing using at least one processor) for performing one or more packet switching functions. For example, virtual switch 108 may be a logical construct implemented using hardware or physical resources from one or more locations, devices, and/or platforms. For example, virtual switch 108 may be implementing using the same computing platform as VM 102 and VM 104.

In some embodiments, virtual switch 108 may be communicatively coupled with or implemented using a hypervisor. For example, a hypervisor may include computer software, firmware or hardware that creates and executes VMs 102-104. In this example, the hypervisor may emulate various physical components for VMs 102-104 and may facilitate communications (e.g., VM commands, data packets, etc.) in virtual environment 100.

In some embodiments, virtual switch 108 may facilitate communications between various virtual entities, such as VM 102 and VM 104. For example, packets from VM 102 may be sent to VM 104 via virtual switch 108. In some embodiments, virtual switch 108 may also facilitate communications between virtual entities and external entities, e.g., physical nodes in network 116. For example, virtual switch 108 may send traffic from VM 102 to network 116 via communications interface(s) 114.

Communications interface(s) 114 may represent any suitable entity or entities (e.g., one or more network interface cards) for sending and/or receiving communications. For example, communications interface(s) 114 may receive and/or send communications between physical nodes in network 116 and virtual entities in virtual environment 100.

Network 116 may represent any suitable data network. For example, network 116 may represent the Internet or a private network associated with a cloud service provider. In some embodiments, network 116 may include one or more additional computing platforms associated with virtual environment 100.

Virtual switch 108 may include VTap 110 for monitoring packets that traverse virtual switch 108. VTap 110 may represent any suitable entity (e.g., software stored in a memory and/or executing using at least one processor) for performing one or more network tap related functions, such as packet monitoring, packet screening, packet copying, and/or packet forwarding. VTap 110 may be a logical construct implemented using hardware or physical resources from one or more locations, devices, and/or platforms. For example, VTap 110 may be implementing using the same computing platform as virtual switch 108, VM 102 and VM 104.

In some embodiments, VTap 110 may interact with VTap controller 106 to receive configuration information and/or various rules. For example, VTap 110 may receive summarization rules and processing rules. In this example, VTap 110 may observe and/or monitor packets and/or related traffic characteristics in accordance with the rules received from VTap controller 106.

In some embodiments, VTap 110 may be configured for dynamic pluggability of one or more rules. For example, VTap 110 may utilize one or more software hooks and/or a representational state transfer (REST) application programming interface (API). In this example, each software hook may allow one or more rules to be inserted or implemented on-the-fly or dynamically, e.g., during normal operation and without restarting VTap 110 or a related computing platform. Continuing with this example, the REST API may be usable for sending communications and/or feedback between VTap 110 and VTap controller 106.

In some embodiments, after performing packet monitoring or related actions, VTap 110 may be configured (by VTap controller 106 and/or related rules) to send summary information and/or packet data to VTap controller 106 and/or other entities (e.g., a network operator or a network operations center). For example, using a REST API and/or a REST API related message, VTap 110 may be configured to send summary packet information to VTap controller 106 via a URI. In this example, the URI may represent a data file location or other resource where the summary packet information is stored.

Data storage 112 may represent any suitable entity (e.g., a non-transitory computer readable medium, embedded memory, or a memory device) for storing data associated with packet monitoring and/or tap related functions. For example, data storage 112 may store summarization rules and/or processing rules. In some embodiments, data storage 112 may be accessible by virtual switch 108, VTap 110, VTap controller 106, and/or other entities. In some embodiments, data storage 112 may be located on a single device or computing platform or may be distributed across multiple devices or computing platforms.

It will be appreciated that FIG. 1 is for illustrative purposes and that various depicted entities, their locations, and/or their functions described above in relation to FIG. 1 may be changed, altered, added, or removed. For example, a device (e.g., a computer including at least one processor coupled to a memory) may include functionality of VTap controller 106 and be separate from one or more computing platforms implementing virtual environment 100.

Figure 2:
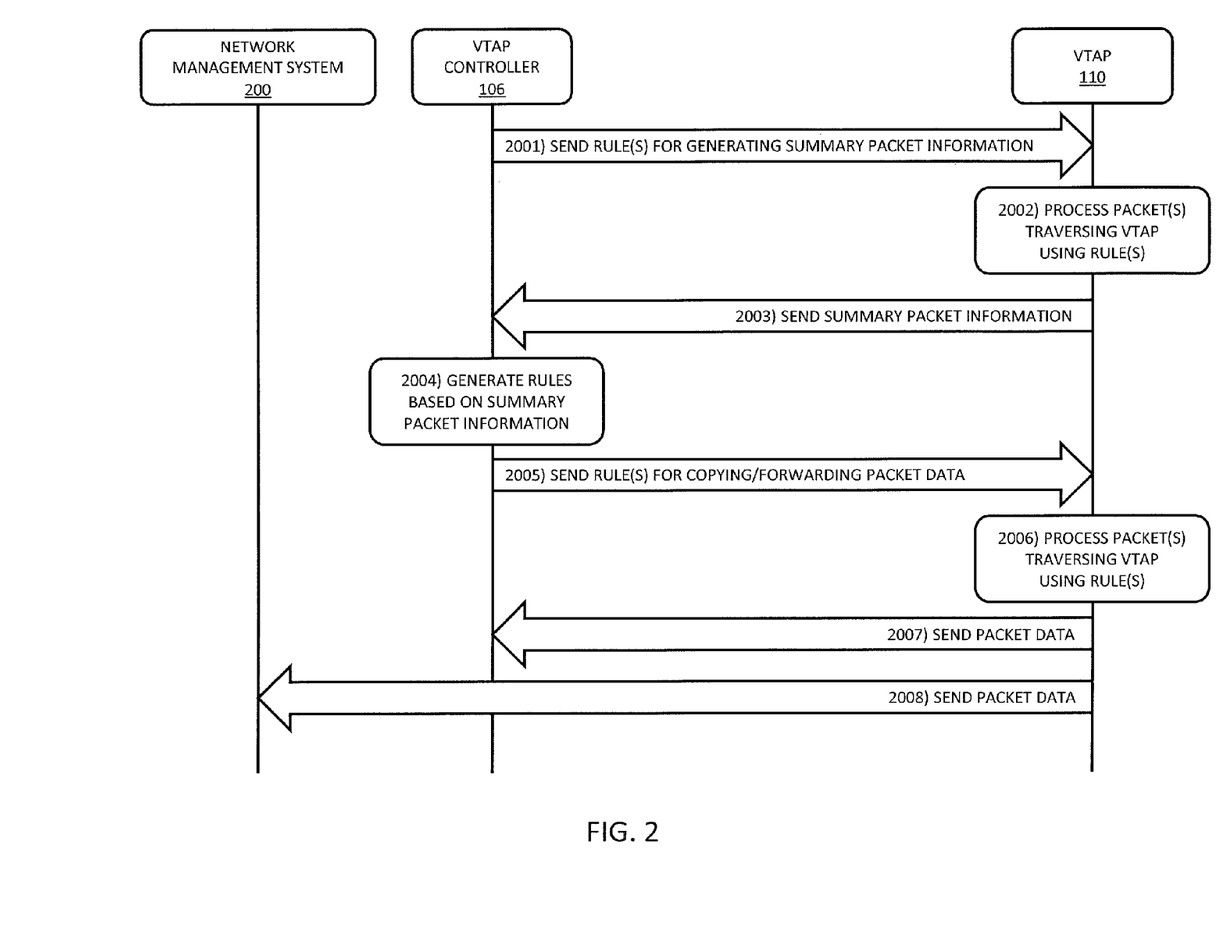
FIG. 2 is a diagram illustrating communications associated with a virtual tap controller according to an embodiment of the subject matter described herein.

FIG. 2 is a diagram illustrating communications associated with VTap controller 106 according to an embodiment of the subject matter described herein. In some embodiments, VTap controller 106 or another entity may interact with virtual environment 100 for configuring, provisioning, or managing VTap 110, virtual switch 108, and/or other entities. For example, VTap controller 106 may configure VTap 110 to generate summary packet information, such as statistics about the amount of different message types sent or received by a particular IP address or VM. In this example, VTap controller 106 may receive and use the summary packet information to configure VTap 110 with customized processing rules (e.g., filters). By generating focused or customized processing rules (e.g., directed to a VM, an IP address, a time period, and/or a type of traffic), VTap controller 106 can monitor packets and/or can troubleshoot traffic related conditions without overwhelming resources (e.g., memory and/or processing throughput) of VTap 110.

Referring to FIG. 2, in step 2001, one or more rules for generating summary packet information may be sent from VTap controller 106 to VTap 110. For example, a REST API related message or another message may be sent to VTap 110 containing at least one summarization rule. In this example, the at least one summarization rule may instruct VTap 110 to generate packet statistics (e.g., packet counts for packets traversing VTap 110 correlated by unique source IP addresses and/or timestamps). Continuing with this example, the at least one summarization rule may also indicate to VTap 110 when to report the packet statistics back to VTap controller 106 and/or another entity, e.g., a network operator.

In step 2002, VTap 110 may process packets traversing VTap 110 or virtual switch 108 using the one or more summarization rules provided by VTap controller 106. For example, using a summarization rule, VTap 110 may generate statistics regarding the amount of packets and types of packets associated with each different source IP address observed for a 10 minute time period.

In step 2003, the summary packet information may be sent from VTap 110 to VTap controller 106. For example, after processing one or more packets in accordance with a summarization rule, VTap 110 may periodically or aperiodically (e.g., dynamically and/or as statistics are generated) report summary packet information to VTap controller 106 and/or other entities. In this example, how often the summary packet information is reported and to whom may be determined by the summarization rule and/or other factors, such as network operator preferences.

In step 2004, VTap controller 106 may use summary packet information to generate at least one processing rule for copying and/or forwarding packet data that traverses VTap 110 or virtual switch 108. For example, using summary packet information and/or other information, VTap controller 106 may determine a traffic related condition (e.g., resource hogging by VM 102 or traffic congestion at virtual switch 108). In this example, VTap controller 106 may analyze the summary packet information using troubleshooting logic or a related algorithm to identify entities that may be causing or contributing to the detected condition and, based on the identified entities and/or the detected condition, may generate at least one processing rule for further analyzing, diagnosing, or mitigating the detected condition. Continuing with this example, assuming that the detected condition is determined to be related to an abnormally large amount of database related traffic originating from VM 102, VTap controller 106 may generate at least one processing rule for instructing VTap 110 to forward such traffic to VTap controller 106 or another entity (e.g., a network operator) for further processing and/or analysis.

In step 2005, one or more rules for copying and/or forwarding packet data may be sent from VTap controller 106 to VTap 110. For example, a REST API related message or another message may be sent to VTap 110 containing at least one processing rule. In this example, the at least one processing rule may instruct VTap 110 to copy packet headers or certain packet header parameter values for all TCP packets originating from VM 102 or a related IP address. Continuing with this example, the at least one processing rule may also indicate to VTap 110 when to send the packet data to VTap controller 106 and/or another entity.

In step 2006, VTap 110 may process packets traversing VTap 110 or virtual switch 108 using the one or more processing rules provided by VTap controller 106. For example, using a processing rule, VTap 110 may copy packet headers for all TCP packets originating from VM 102 or a related IP address. In another example, using a processing rule, VTap 110 may copy packet payloads or portions thereof for all UDP packets having a packet size greater than 64 kilobytes (KBs).

In step 2007, packet data may be sent from VTap 110 to VTap controller 106. For example, a processing rule may instruct VTap 110 to periodically or aperiodically (e.g., dynamically and/or as packet data is copied) send packet data to VTap controller 106 and/or other entities. In this example, when and/or how often packet data is sent and to whom may be determined by the processing rule and/or other factors.

In step 2008, packet data may be sent from VTap 110 to a network management system 200. For example, a processing rule may instruct VTap 110 to periodically or aperiodically (e.g., dynamically and/or as packet data is copied) send packet data to a network operator via network management system 200.

It will be appreciated that the communications and/or actions depicted in FIG. 2 are for illustrative purposes and that different and/or additional communications and/or actions than those depicted in FIG. 2 may be used for packet monitoring and/or related activities. It will also be appreciated that various communications and/or actions described herein may occur concurrently or in a different order or sequence.

Figure 3:
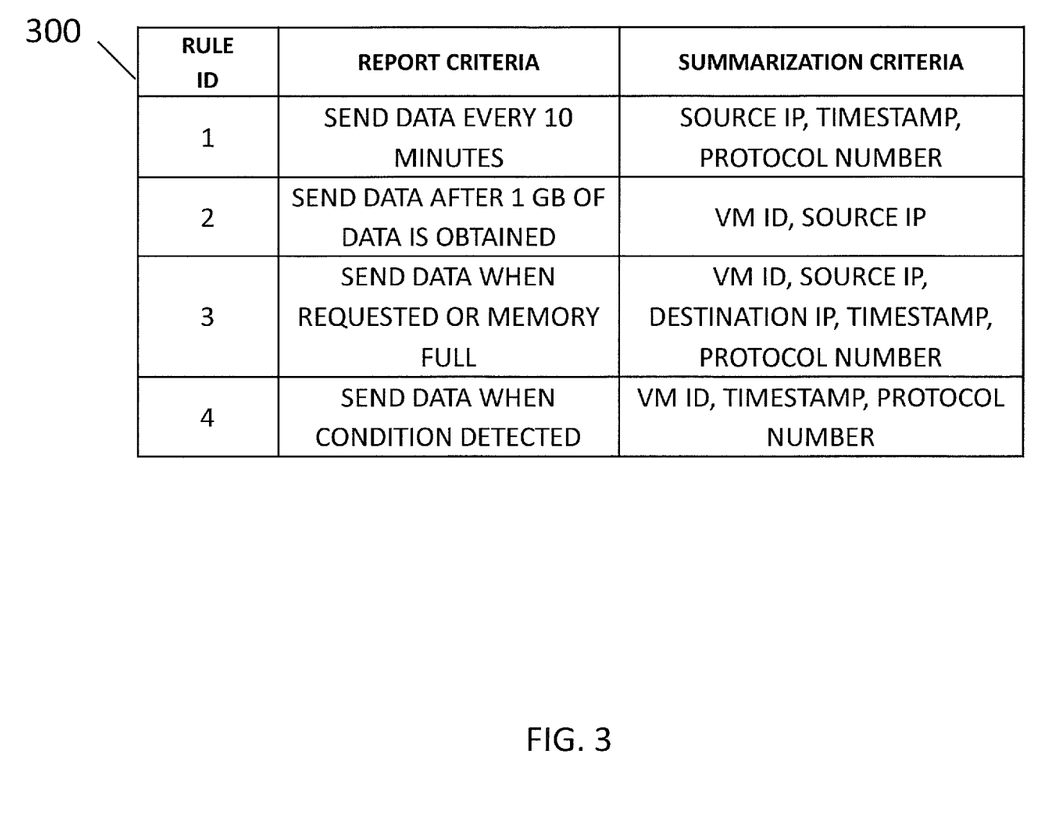
FIG. 3 is a diagram illustrating summarization rule information according to an embodiment of the subject matter described herein.

FIG. 3 is a diagram illustrating summarization rule information 300 according to an embodiment of the subject matter described herein. Summarization rule information 300 may represent any information associated with obtaining summary packet information, such as one or more summarization rules or portions thereof, e.g., rule IDs, report criteria, and summarization criteria.

In some embodiment, summarization rule information 300 may be usable for collecting and/or generating summary packet information (e.g., statistics and/or packet counts) related to observed traffic. For example, a summarization rule may indicate some data to aggregate and/or one or more metrics (e.g., packet counts and VM resource utilization percentages) to generate based on the observed traffic and/or aggregated data.

In some embodiments, summarization rule information 300 may be accessed and/or stored by virtual switch 108, VTap 110, and/or VTap controller 106. In some embodiments, summarization rule information 300 may be stored in data storage 112 using various data structures.

Referring to FIG. 3, summarization rule information 300 may include associations between rule IDs, report criteria, and/or summarization criteria and may be depicted using a table. For example, a table representing summarization rule information 300 may comprise columns and/or fields for a rule ID, report criteria, and/or summarization criteria.

A rule ID field may comprise a value, a name, and/or a related identifier for indicating a rule. For example, a rule ID may include a unique sequence of numbers and/or characters. In some embodiments, where summarization rule information 300 is stored for multiple VTaps, each rule ID may indicate a particular VTap that is to implement the rule and a unique number for identifying that rule at that particular VTap, e.g., 'VTap1-1', 'VTap2-1', 'VTap3-1', and 'VTap3-2'. In some embodiments, where summarization rule information 300 is only stored for VTap 110, a rule ID may omit information indicating the implementing VTap, e.g., '1', '2', and '3'.

A report criteria field may comprise information for indicating when summary packet information is to be reported by or sent from VTap 110. For example, a report criteria field may include various criteria for indicating when summary packet information is to be reported, such as after a condition is detected (e.g., a congestion or bandwidth condition) and/or after a request from VTap controller 106. In another example, a report criteria field may include a threshold value that when met or exceeded causes VTap 110 to send summary packet information to VTap controller 106 and/or another entity. In this example, the threshold value may be related to an amount of elapsed time (e.g., 5 minutes), an amount of packet data collected or summarized (e.g., 1 gigabyte (GB) collected), and/or an amount of resource utilization (e.g., memory is 85% full).

A summarization criteria field may comprise information for indicating packet information that is to be collected and/or summarized. For example, a summarization criteria field may include packet header parameter values (e.g., a source IP address, a destination IP address, a timestamp, a protocol number or type, a VM ID, and/or a sequence number) and/or other traffic related characteristics (e.g., a packet size, a jitter value, and/or a latency value).

As depicted in FIG. 3, summarization criteria may indicate that statistics are to be correlated to source IP addresses, timestamps, and protocol types, that statistics are to be correlated to VM IDs and source IP addresses, that statistics are to be correlated to VM IDs and source IP addresses, destination IP addresses, timestamps, and protocol types, or that statistics are to be correlated to VM IDs, timestamps, and protocol types.

It will also be appreciated that summarization rule information 300 is for illustrative purposes and that additional data than the data depicted in FIG. 3 may be usable for representing summarization rules or portions thereof. Further, summarization rule information 300 may be stored or managed using various data structures and/or computer readable media.

Figure 4:
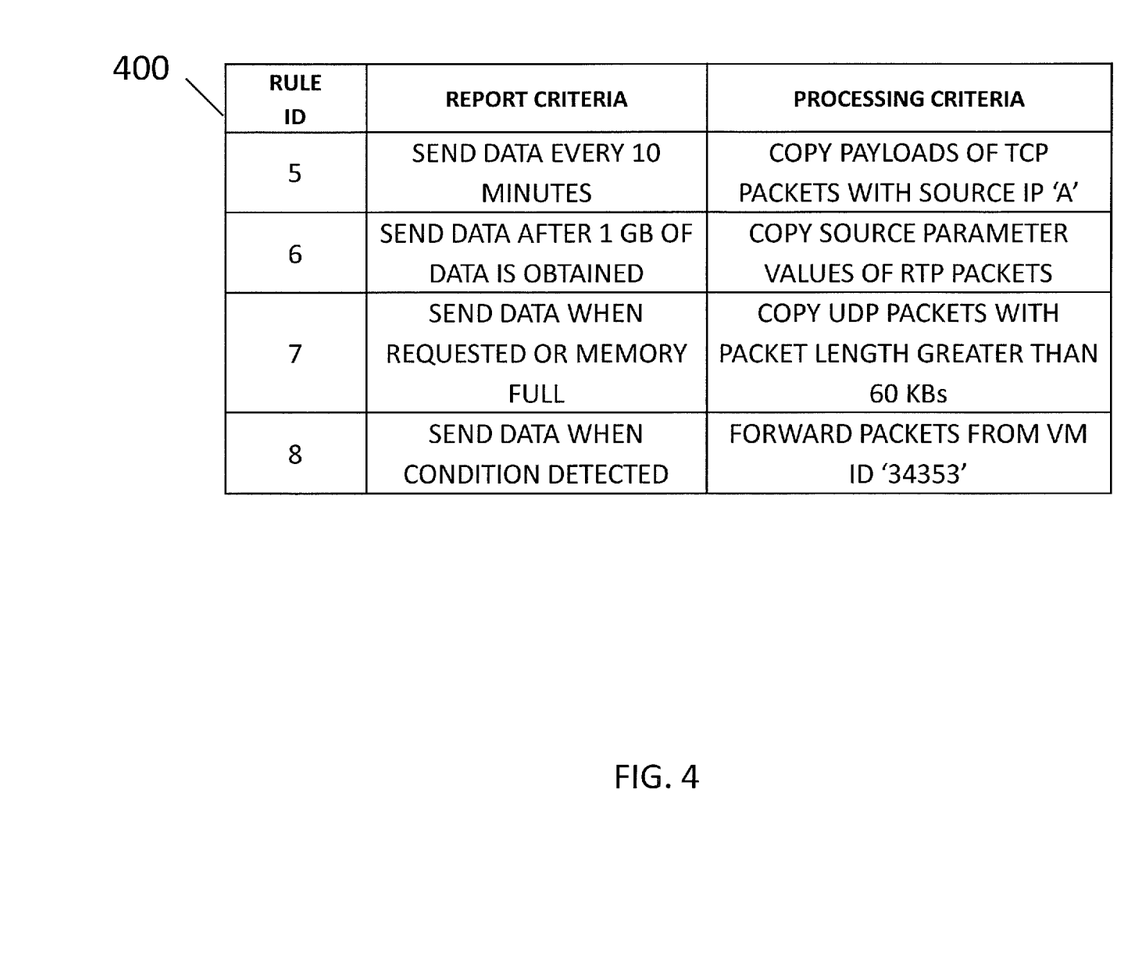
FIG. 4 is a diagram illustrating processing rule information according to an embodiment of the subject matter described herein.

FIG. 4 is a diagram illustrating processing rule information 400 according to an embodiment of the subject matter described herein. Processing rule information 400 may represent any information associated with obtaining packet information, such as one or more processing rules or portions thereof, e.g., rule IDs, report criteria, and processing criteria.

In some embodiments, processing rule information 400 may be accessed and/or stored by virtual switch 108, VTap 110, and/or VTap controller 106. In some embodiments, processing rule information 400 may be stored in data storage 112 using various data structures.

Referring to FIG. 4, processing rule information 400 may include associations between rule IDs, report criteria, and/or processing criteria and may be depicted using a table. For example, a table representing processing rule information 400 may comprise columns and/or fields for a rule ID, report criteria, and/or processing criteria.

A rule ID field may comprise a value, a name, and/or a related identifier for indicating a rule. For example, a rule ID may include a unique sequence of numbers and/or characters. In some embodiments, where processing rule information 400 is stored for multiple VTaps, each rule ID may indicate a particular VTap that is to implement the rule and a unique number for identifying that rule at that particular VTap. In some embodiments, where processing rule information 400 is only stored for VTap 110, a rule ID may omit information indicating the implementing VTap.

A report criteria field may comprise information for indicating when packet data is to be reported by or sent from VTap 110. For example, a report criteria field may include various criteria for indicating when packet data is to be sent or forwarded, such as after a condition is detected (e.g., a congestion or bandwidth condition) and/or after a request from VTap controller 106. In another example, a report criteria field may include a threshold value that when met or exceeded causes VTap 110 to send packet data to VTap controller 106 and/or another entity (e.g., indicated by the rule). In this example, the threshold value may be related to an amount of elapsed time (e.g., 5 minutes), an amount of packet data collected (e.g., 1 gigabyte (GB) collected), and/or an amount of resource utilization (e.g., memory is 85% full).

A processing criteria field may comprise information for indicating packet data that is to be copied and/or forwarded. For example, a processing criteria field may include packet header parameter values (e.g., a source IP address, a destination IP address, a timestamp, a protocol number or type, a VM ID, and/or a sequence number) and/or other traffic related characteristics (e.g., a packet size, a jitter value, and/or a latency value) for indicating packet data to copy and/or forward.

As depicted in FIG. 4, processing criteria may indicate that payloads of TCP packets with a particular source IP address 'A' are to be copied, that source parameter values (e.g., a stream ID and/or an origination ID) of RTP packets are to be copied, that UDP packets with packet lengths greater than 60 KBs are to be copied, or that packets from a particular VM is to be forwarded to another entity (e.g., VTap controller 106).

It will also be appreciated that processing rule information 400 is for illustrative purposes and that additional data than the data depicted in FIG. 4 may be usable for representing summarization rules or portions thereof. Further, processing rule information 400 may be stored or managed using various data structures and/or computer readable media.

Figure 5:
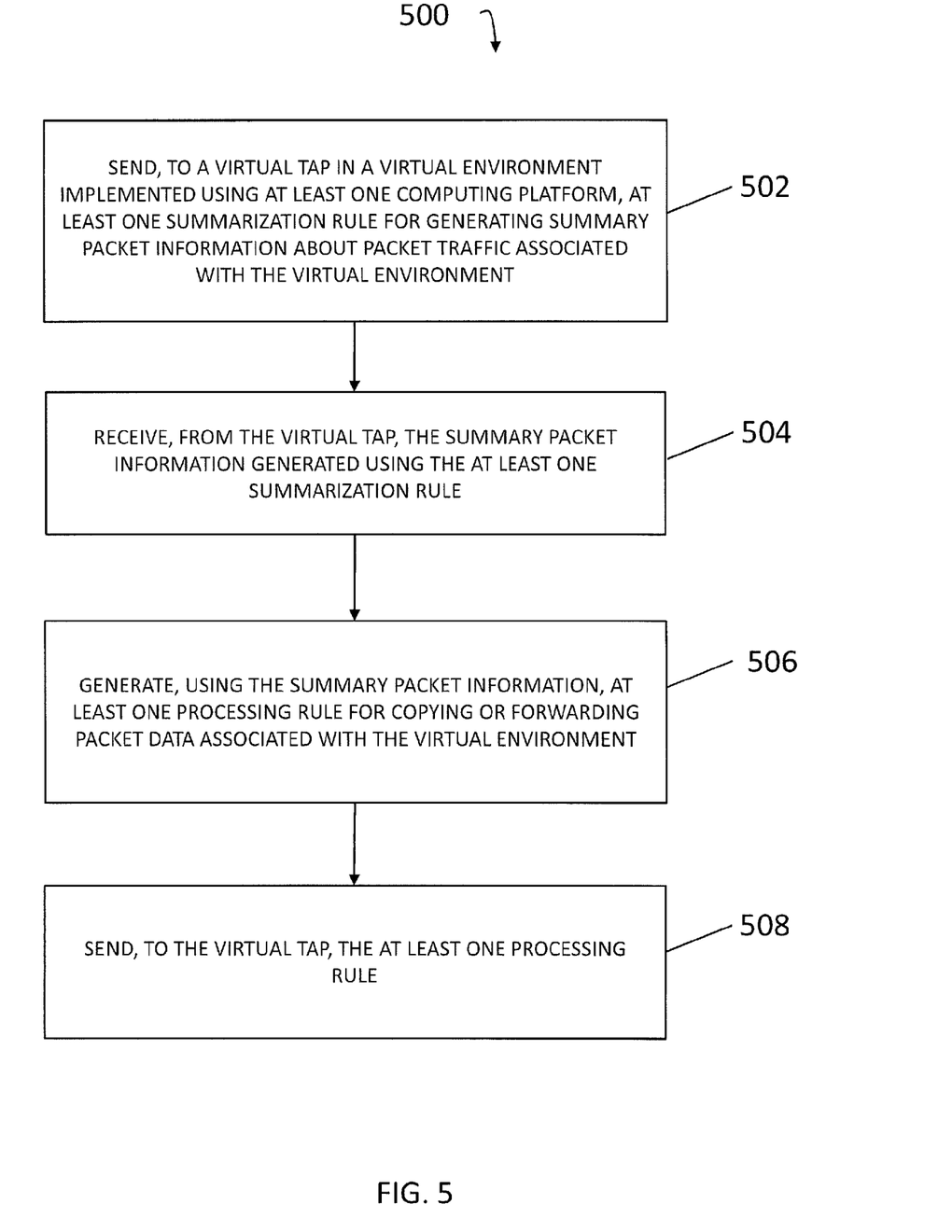
FIG. 5 is a diagram illustrating a process for packet monitoring in a virtual environment according to an embodiment of the subject matter described herein.

FIG. 5 is a diagram illustrating a process 500 for packet monitoring in a virtual environment according to an embodiment of the subject matter described herein. In some embodiments, process 500, or portions thereof, may be performed by or at VTap controller 106, virtual switch 108, VTap 110, and/or another node or module. In some embodiments, process 500 may include steps 502, 504, 506, and/or 508.

Referring to process 500, in step 502, at least one summarization rule for generating summary packet information about packet traffic associated with the virtual environment may be sent to a virtual tap in a virtual environment implemented using at least one computing platform. For example, a summarization rule for capturing 10 bytes of packet header information of every packet from VM 104 may be sent from VTap controller 106 to VTap 110.

In step 504, the summary packet information generated using the at least one summarization rule may be received from the virtual tap. For example, after implementing a summarization rule, VTap 110 may observe and collect summary packet information, such as packet header information or related traffic statistics, associated with packets traversing VTap 110. In this example, after meeting a reporting threshold or other criteria, VTap 110 may send the summary packet information to VTap controller 106.

In step 506, at least one processing rule for copying or forwarding packet data associated with the virtual environment may be generated using the summary packet information. For example, after receiving summary packet information indicating that VM 102 is generated a significant amount of database related traffic, VTap controller 106 may generate a processing rule that instructs the VTap 110 VTap to forward database related traffic from VM 102 to VTap controller 106 or another entity.

In step 508, the at least one processing rule may be sent to the virtual tap. For example, after generating a processing rule for forward database related traffic from VM 102 to VTap controller 106 or another entity, VTap controller 106 may send the processing rule to VTap 110 for implementation.

In some embodiments, at least one summarization rule and/or at least one processing rule may be implemented dynamically using a software hook and/or a REST API. For example, VTap 110 may include a software hook (e.g., executable code that points to a memory location for storing executable rules) that allows various rules to be utilized and/or swapped during operation (e.g., without restarting or re-initialization). In this example, VTap 110 may provide, via REST API related message, at least one uniform resource identifier (URI) to VTap controller 106, where the at least URI indicates at least one hook for implementing pluggable rules.

In some embodiments, packet data associated with the virtual environment may be received from the virtual tap and at least one action may be performed using the packet data. For example, in response to a processing rule, packet data may be sent from VTap 110 to VTap controller 106. In this example, after receiving the packet data, VTap controller 106 may analyze the packet data and perform at least one action.

In some embodiments, at least one action (e.g., performed by VTap controller 106) may include sending a command to VM 102 associated with the virtual environment for instructing VM 102 to terminate, start, restart, stop, or pause.

In some embodiments, generating at least one processing rule may include using summary packet information to identify VM or a virtualization container contributing to a network condition (e.g., congestion) and generating the at least one processing rule for instructing VTap 110 to copy or forward packet data associated with the VM or the virtualization container.

In some embodiments, at least one processing rule may instruct VTap 110 to send the packet data after an amount of time elapses (e.g., every 2 minutes), after an amount of packet data reaches or exceeds a threshold (e.g., after 1 GB of data is collected or related memory is full), after a condition is detected (e.g., a congestion or bandwidth condition), or after a request from VTap controller 106.

In some embodiments, at least one summarization rule may instruct VTap 110 to send the packet data after an amount of time elapses (e.g., every 5 minutes), after an amount of packet data reaches or exceeds a threshold (e.g., after 0.5 GB of data is collected or related memory is full), after a condition is detected (e.g., a congestion or bandwidth condition), or after a request from VTap controller 106.

In some embodiments, VTap 110 and VTap controller 106 may be implemented using at least one computing platform (e.g., a same virtualization server or platform).

In some embodiments, VTap 110 may be implemented using at least one computing platform (e.g., a virtualization server) and VTap controller 106 may be implemented using a separate computing platform (e.g., a network tool, a network test platform, or a test device).

It will be appreciated that process 500 is for illustrative purposes and that different and/or additional actions may be used. It will also be appreciated that various actions described herein may occur in a different order or sequence.

It should be noted that VTap controller 106, VTap 110, virtual switch 108, and/or functionality described herein may constitute a special purpose computing device. Further, VTap controller 106, VTap 110, virtual switch 108, and/or functionality described herein can improve the technological field of packet monitoring by providing mechanisms for monitoring packets in a virtual environment. Further, by using summarization rules and related summary packet information to identify potential issues, VTap controller 106 may generate focused (e.g., customized or tailored to particular VMs or IP addresses) processing rules, thereby reducing resource utilization by VTap 110 (e.g., where only a small portion of packets or related data need to be processed).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for packet monitoring in a virtual environment, the method comprising:
at a virtual tap controller implemented using at least one processor:
sending, to a virtual tap in a virtual environment implemented using at least one computing platform, at least one summarization rule for generating summary packet information about packet traffic associated with the virtual environment;
receiving, from the virtual tap, the summary packet information generated using the at least one summarization rule;
generating, using the summary packet information, at least one processing rule for copying or forwarding packet data associated with the virtual environment; and
sending, to the virtual tap, the at least one processing rule, wherein generating the at least one processing rule includes using the summary packet information to identify a virtual machine (VM) or a virtualization container contributing to a network condition and generating the at least one processing rule for instructing the virtual tap to copy or forward packet data associated with the VM or the virtualization container.

2. The method of claim 1 comprising:
implementing, by the virtual tap, the at least one summarization rule or the at least one processing rule dynamically using a software hook or a representational state transfer (REST) application programming interface (API).

3. The method of claim 1 comprising:
receiving, from the virtual tap, the packet data associated with the virtual environment; and
performing at least one action using the packet data.

4. The method of claim 3 wherein the at least one action includes sending a command to a virtual machine (VM) associated with the virtual environment, wherein the command instructs the VM to terminate, start, restart, stop, or pause.

5. The method of claim 1 wherein the at least one processing rule instructs the virtual tap to send the packet data after an amount of time elapses, after an amount of packet data reaches or exceeds a threshold, after a condition is detected, or after a request from the virtual tap controller.

6. The method of claim 1 wherein the at least one summarization rule instructs the virtual tap to send the summary packet information after an amount of time elapses, after an amount of packet data reaches or exceeds a threshold, after a condition is detected, or after a request from the virtual tap controller.

7. The method of claim 1 wherein the virtual tap and the virtual tap controller are implemented using the at least one computing platform.

8. The method of claim 1 wherein the virtual tap is implemented using the at least one computing platform and the virtual tap controller is implemented using a separate computing platform.

9. A system for packet monitoring in a virtual environment, the system comprising:
at least one processor; and
a virtual tap controller implemented using the at least one processor, wherein the virtual tap controller is configured to send, to a virtual tap in a virtual environment implemented using at least one computing platform, at least one summarization rule for generating summary packet information about packet traffic associated with the virtual environment, to receive, from the virtual tap, the summary packet information generated using the at least one summarization rule, to generate, using the summary packet information, at least one processing rule for copying or forwarding packet data associated with the virtual environment, and to send, to the virtual tap, the at least one processing rule, wherein generating the at least one processing rule includes using the summary packet information to identify a virtual machine (VM) or a virtualization container contributing to a network condition, wherein the at least one processing rule instructs the virtual tap to copy or forward packet data associated with the VM or the virtualization container.

10. The system of claim 9 wherein the virtual tap is configured to implement the at least one summarization rule or the at least one processing rule dynamically using a software hook or a representational state transfer (REST) application programming interface (API).

11. The system of claim 9 wherein the virtual tap controller is configured to receive, from the virtual tap, the packet data associated with the virtual environment and to perform at least one action using the packet data.

12. The system of claim 11 wherein the at least one action includes sending a command to a virtual machine (VM) associated with the virtual environment, wherein the command instructs the VM to terminate, start, restart, stop, or pause.

13. The system of claim 9 wherein the at least one processing rule instructs the virtual tap to send the packet data after an amount of time elapses, after an amount of packet data reaches or exceeds a threshold, after a condition is detected, or after a request from the virtual tap controller.

14. The system of claim 9 wherein the at least one summarization rule instructs the virtual tap to send the summary packet information after an amount of time elapses, after an amount of packet data reaches or exceeds a threshold, after a condition is detected, or after a request from the virtual tap controller.

15. The system of claim 9 wherein the virtual tap and the virtual tap controller are implemented using the at least one computing platform.

16. The system of claim 9 wherein the virtual tap is implemented using the at least one computing platform and the virtual tap controller is implemented using a separate computing platform.

17. A non-transitory computer readable medium having stored thereon executable instructions embodied in the computer readable medium that when executed by at least one processor of a virtual tap controller cause the virtual tap controller to perform steps comprising:
at a virtual tap controller implemented using at least one processor:
sending, to a virtual tap in a virtual environment implemented using at least one computing platform, at least one summarization rule for generating summary packet information about packet traffic associated with the virtual environment;
receiving, from the virtual tap, the summary packet information generated using the at least one summarization rule;
generating, using the summary packet information, at least one processing rule for copying or forwarding packet data associated with the virtual environment; and
sending, to the virtual tap, the at least one processing rule, wherein generating the at least one processing rule includes using the summary packet information to identify a virtual machine (VM) or a virtualization container contributing to a network condition and generating the at least one processing rule for instructing the virtual tap to copy or forward packet data associated with the VM or the virtualization container.

18. The non-transitory computer readable medium of claim 17 having stored thereon executable instructions embodied in the computer readable medium that when executed by at least one processor of the at least one computing platform cause the virtual tap to perform steps comprising:
implementing the at least one summarization rule or the at least one processing rule dynamically using a software hook or a representational state transfer (REST) application programming interface (API).

* * * * *